United States Patent [19]

Musschoot

[11] Patent Number: 4,604,023
[45] Date of Patent: Aug. 5, 1986

[54] SHAKEOUT APPARATUS

[75] Inventor: Albert Musschoot, Barrington, Ill.

[73] Assignee: General Kinematics Corporation, Barrington, Ill.

[21] Appl. No.: 615,771

[22] Filed: May 31, 1984

[51] Int. Cl.$^4$ ............................................. B65G 67/24
[52] U.S. Cl. ................................ 414/375; 414/525 A
[58] Field of Search ........... 414/363, 365, 375, 525 A, 414/572; 198/533; 74/87; 105/239, 247, 248

[56] References Cited

U.S. PATENT DOCUMENTS

| | | | |
|---|---|---|---|
| 2,471,849 | 5/1949 | Wallace | 414/525 A |
| 3,100,053 | 8/1963 | Spurlin | 414/525 A |
| 3,233,474 | 2/1966 | Ross et al. | 414/525 A X |

Primary Examiner—Joseph E. Valenza
Assistant Examiner—Ken Muncy
Attorney, Agent, or Firm—Wood, Dalton, Phillips, Mason & Rowe

[57] ABSTRACT

A container shakeout apparatus is provided and has a rigid frame upon which a pair of motors supporting eccentric weights are mounted. Spring reactor members are suspended from the frame and said springs in turn suspend a pair of hammers which are adopted to engage the top edge of the spaced sides of a loaded container such as a hopper car. The motors and eccentric weights form a single mass system having a natural frequency close to the operating speed of said motors when said hammers are in contact with the container; and said frame, springs and hammers form a two mass system having a natural frequency above the operating speed of the motors when said hammers break contact with the container whereby the combined alternating single mass system and two mass system produce rapid high energy vertical impacts on the container for loosening material in the container.

9 Claims, 3 Drawing Figures

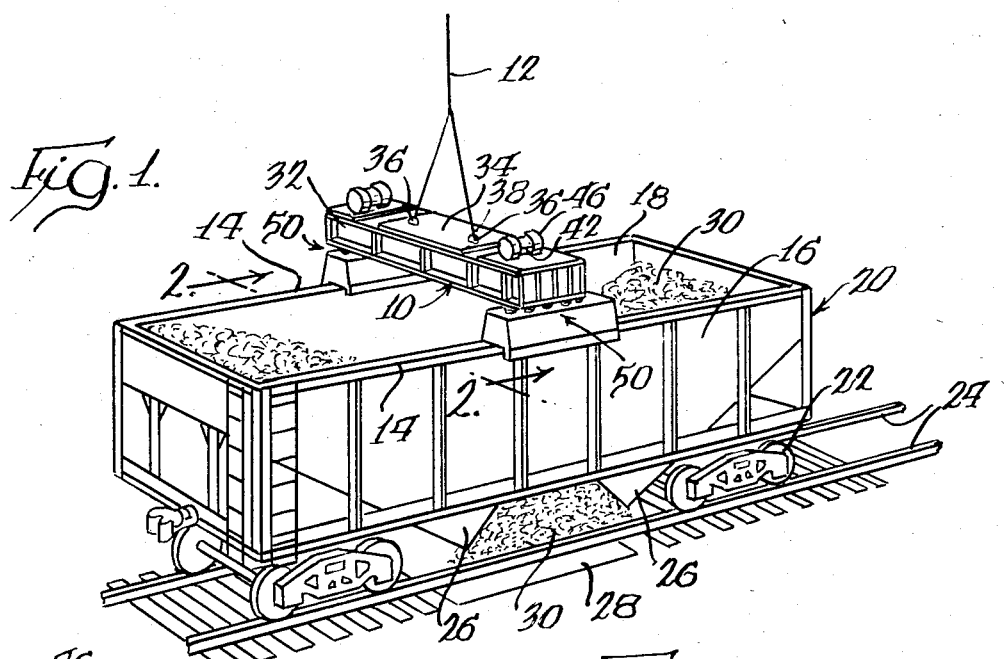
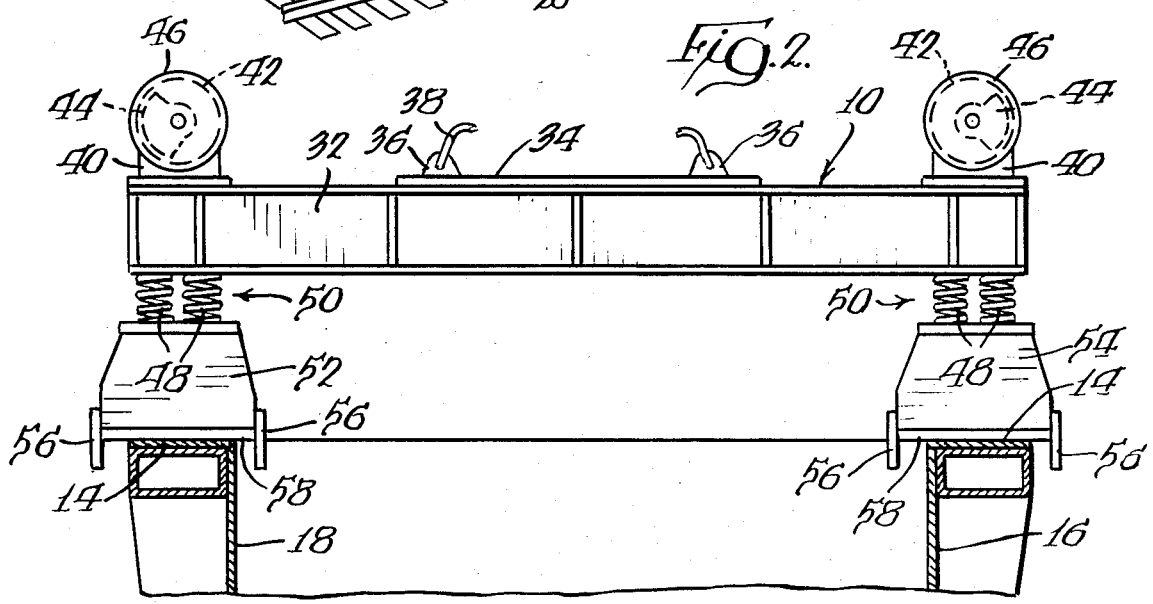
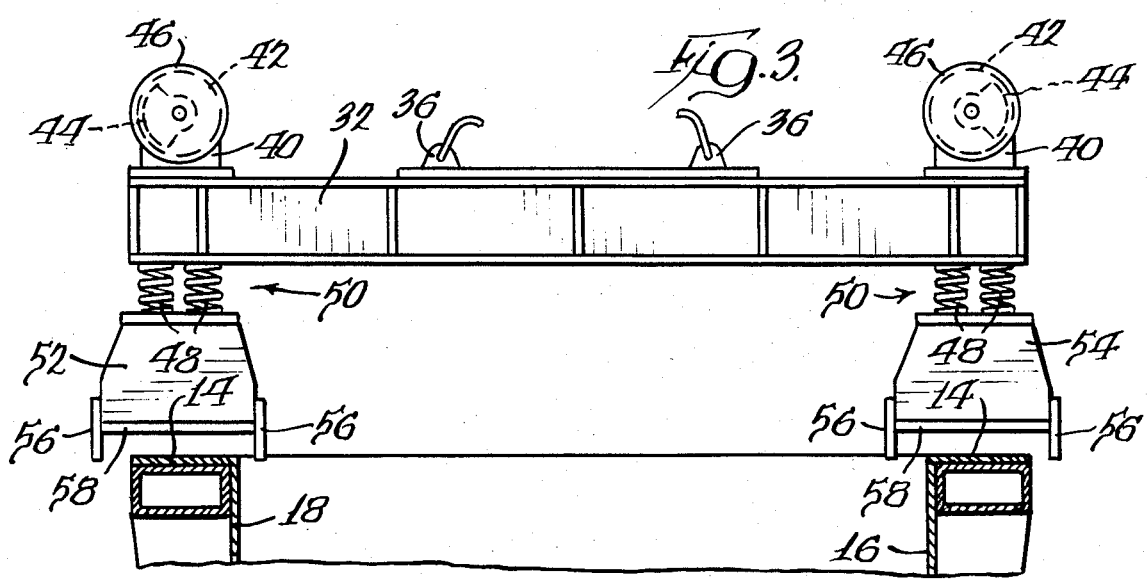

SHAKEOUT APPARATUS

DESCRIPTION

1. Technical Field

This invention relates to a shakeout apparatus and more particularly to a high frequency, low amplitude vibratory apparatus for bulk storage container shakeout with reduced risk of container frame fracture.

2. Background of the Invention

Bulk storage containers such as railway hopper cars loaded with granular or particulate type material (i.e. coal, ore, stone) are desirably off-loaded as rapidly and as completely as is possible. Two of the more popular systems for off-loading such cars are (1) car tipping or dumping and (2) car shaking. The car tipping and dumping apparatus, one of which is known as a rotary-power dumper, engages the loaded car and turns it over sideways to dump the load into a hopper. Some such equipment rotates the car a complete 360° and places the empty car back on the track. Obviously the rotary dump-type equipment is expensive to build and expensive to maintain but it does have the advantage of being fast and generally complete in its dumping.

The second popular system is called a car-shaker and comprises a heavy yoke which has each arm resting on a car side with the body of the yoke straddling the inside of the car. An unbalanced pulley driven by a motor mounted directly on the yoke delivers brute force blows to the sides of the car to shake the contents loose for flowing out the sloping discharge chutes of the car. The unbalanced pulley operates at 20,000 rev./min., applying a rapid pounding on the car sides. The brute force rapid blows damages the cars and has been suspected of contributing to the fracturing of car frames. The flanges on the top edges of the car side become flattened and cold worked until they rupture, thereby weakening the car sides and limiting its load carrying capacity.

SUMMARY OF THE INVENTION

The present invention overcomes the disadvantages and problems of the prior art and provides an improved bulk storage container shakeout apparatus using a unique three-mass design which draws less power and isolates the drive system from the hammer action.

A rigid reinforced exciter frame has a pair of spaced apart self-contained vibratory drives mounted on each end portion thereof. A coil spring reactor system is mounted beneath each end portion of the frame and suspends an impact hammer therefrom. The hammers and spring systems are aligned with the vibratory drives. The apparatus is lowered onto the container or car with the impact hammers engaging on the top flanges of the sides of the container or car.

With the hammers resting on the car sides, the vibratory drives are operated as a single mass system with the natural frequency of the drives being substantially equal to or slightly greater than the operating speed of the motors. As a result, a low amplitude, high frequeny vibratory force is produced by the vibratory drives (first mass) and is amplified through the spring reactor systems and transferred to the hammers. As the vibratory drives stabilize, the hammers will leave the car sides and become two mass systems with an operating natural frequency about 20% above the operating speed of the motor. The hammers deliver a series of rapid, high energy, vertical impacts directly into the car sides to loosen compacted, sluggish or frozen material and enhance free flow through the hopper bottom.

The high frequency, low amplitude vibration reduces risk of frame fracture.

BRIEF DESCRIPTION OF DRAWINGS

FIG. 1 is a perspective view of a loaded railway hopper car with my improved car shaker apparatus lowered into operating position on the car sides;

FIG. 2 is a cross-sectional view taken along line 2—2 of FIG. 1 showing the car shaker assembly in front elevation; and FIG. 3 is a view similar to FIG. 2 only with the car shaker assembly at a raised intermediate stage of a vibratory cycle.

BEST MODE FOR CARRYING OUT INVENTION

Referring to FIG. 1, an improved shaker apparatus 10 is shown being lowered by a cable or chain 12 from a fixed location or a traveling hoist into position on the lip or flange 14 on the top edge of the side walls 16,18 of a railway hopper car 20. It is to be understood that the shaker apparatus may be used to loosen and enhance the flow of material in any bulk storage container whether fixed or mobile. The present disclosure will proceed to describe the use of the shaker on a railway hopper car 20. The car 20 has truck mounted wheels 22 riding on railway tracks 24. A pair of gate operated discharge outlets 26 are built on the bottom of the car through which material carried in the car can be discharged. The car 20 will be moved to a position over the entrance to a storage bunker 28 or a storage chamber from the bottom of which bunker or chamber the material can be removed as by use of a vibratory apparatus such as is shown and described in U.S. Pat. No. 4,131,193, issued Dec. 26, 1978 to the present inventor. Frequently the material 30, such as coal, ore, grain or the like, has become compacted in the car due to freezing, moisture or just the settling effect caused by the motion of the car over the tracks from the mine. When the gates of the outlets 26 are opened, the material flows into the storage area. To loosen the compacted, sluggish or frozen material and to enhance the free flow of the material from the car, the car shaker apparatus 10 is used.

The car shaker apparatus 10 is comprised of a weighted and rigid reinforced steel frame 32 which, in the illustrated form, is rectangular in configuration and has a reinforcing plate 34 attached in the mid-portion thereof. A pair of lifting eyes 36 are secured to the plate 34 in symmetrical locations on the frame so that hooks 38 or the like on the chain or cable 12, when attached to the eyes 36, can be used to lift the frame and the apparatus. When the apparatus is lowered into position on the car, the cable is extended so that the full weight of the apparatus is on the car.

A pair of motor mounting supports 40 are mounted on the opposite end portions of the frame 32 along the major long axis of the rectangular frame. A motor 42 having a pair of eccentric weights 44 is secured to each mounting support 40. The eccentric weights are carried on the opposite ends of the motor shaft, are compact and are enclosed in a sealed compartment 46 for dust and moisture protection. No belts, sheaves, guards or moving parts are exposed to dirt, moisture or accidental damage. It is contemplated that an apparatus such as shown in U.S. Pat. No. 4,168,774, issued Sept. 25, 1979 to the present inventor, may be used in the compartments 46 to vary the vibratory force of the system from a remote location. The vibratory force is varied to suit the conditions, i.e. type of material, moisture content, frozen material or the like.

A plurality of coil springs 48 are assembled into two groups with one group attached to the underside of each end portion of the frame 32. The two groups of springs make up a coil spring reactor system 50. Attached to the lower ends of the springs of each group is a pair of hammers or anvils 52,54, which hammers and attached groups of springs are generally vertically aligned with one of the motor and eccentric vibratory drives. Each hammer 52,54 has downwardly depending plates 56 attached on the opposite sides of the contact pad 58 of the hammer. The plates 56 are parallel to each other and lie in planes perpendicular to the long axis of the frame 32. The plates 56 serve as guides in placing the apparatus 10 on the car sides and prevent the hammers 52,54 from misaligning with the car sides due to walking of the apparatus during impacting of the car.

The apparatus is designed with each motor and eccentric weight set independently operated such that the weights of the two sets will self-synchronize. The apparatus when resting upon the sides of the car and when the motors 42 are started, will initially operate as a single mass system with the synchronized vibratory drives operating at a natural frequency equal to or slightly greater than the speed of the motors 42. As an example, the motors are driven at 1200 rev./min. wth the natural frequency of the vibratory drives being 20 cycles/sec or slightly higher, i.e. 22 cycles/sec. As the vibrations travel to and through the springs 48 to the hammers 52,54, the hammers begin to impact the sides of the car. The amplitude of the impacts increase until the hammers 52,54 bounce upward from the sides of the car whereupon the single mass system becomes a two-mass system with a natural frequency about 20% higher than the speed of the motors 42. As an example, the motor is driven at 1200 rev./min. with the natural frequency of the two-mass system (motors and eccentrics being one mass and the hammers being the second mass) being 24 to 25 cycles/sec. The continued operation of the system is a combination of the natural frequency of a single mass system and a two mass system generating rapid high energy vertical impacts. The stroke (amplitude) of the single mass system starts to build up until the hammers leave the car sides whereupon the natural frequency changes to a two mass system reducing the stroke (amplitude). In this way the stroke (amplitude) never builds or amplifies to a point where the apparatus destroys itself. Using the principle of natural frequency, a low amplitude, high frequency vibratory force produced by the motorized exciter assembly (first mass) is amplified through the coil spring reactor system and transferred to the pair of impact hammers (second and third masses). The hammers transmit a series of rapid, high energy vertical impacts directly into the car sides to loosen the compacted, sluggish or frozen material and to expedite its flow through the hopper discharge outlets 26.

The apparatus using the natural frequency system combines low power requirements with superior operation. The self contained vibratory drives, the rigid exciter frame, the heavy duty coil springs and the massive hammers provide a highly reliable and efficient car shaker. The vibratory forces of the vibratory drives can be varied to accommodate for optimum flow characteristics of different materials being handled. The hammers are suspended by the springs from the rigid frame so as to assure that the vibratory drives are isolated from the impacts of the hammers, thereby assuring longer life for the apparatus. The drive isolation, the independent hammer action, the stress relieved construction and the few moving parts all contribute to long, trouble free operation.

After each car is emptied, the hoist is used to raise the car shaker apparatus, whereupon the car is moved on and a new loaded car is moved into position over the bunker. The car shaker apparatus is lowered into contact with the car sides, the cable on the hoist is extended so that no tension remains in the cable (the weight of the apparatus is fully bearing on the car sides), and the motors are started and run at a preselected output for the drives whereupon the exciter assembly applies high frequency, low amplitude vibratory force through the spring reactor system to the hammers for transmitting a series of rapid, high energy vertical impacts to the car sides.

I claim:

1. A shakeout apparatus for loosening material in a loaded car comprising a frame, a pair of motors mounted on the opposite end portions of said frame, at least one eccentric weight mounted on the output shaft of each motor, a pair of hammers resiliently carried by said frame, spring means suspending said hammers from said frame, means for independently driving said motors and eccentrics whereby the eccentrics will self-synchronize, said motors and eccentric weights forming a single mass system having a natural frequency close to the operating speed of said motors when said hammers are in contact with the car; said frame, spring means and hammers forming a two mass system having a natural frequency above the operating speed of the motors when said hammers break contact with the car whereby the combined alternating single mass system and two mass system produce high frequency, low amplitude vibrations in the car for loosening material in the car.

2. A car shakeout apparatus as claimed in claim 1 wherein said frame is rectangular in configuration, said motors and eccentric weights are mounted on the opposite end portions of the rectangle along the long axis thereof and one of said hammers is in vertical alignment with one of said motors.

3. A car shakeout apparatus as claimed in claim 1 wherein support means are provided on the frame for supporting said motors.

4. A car shakeout apparatus as claimed in claim 1 wherein means are provided for raising and lowering the apparatus into position on the car with one hammer engaging the top edge of each side wall of the car.

5. A car shakeout apparatus as claimed in claim 1 wherein a pair of eccentric weights are mounted on each motor for generating the vibratory motion for the apparatus.

6. A car shakeout apparatus as claimed in claim 1 wherein each hammer has a replaceable shoe in contact with the car.

7. A car shakeout apparatus as claimed in claim 1 wherein the motor operates at a speed of 1200 rev./min. and the natural frequency of the motor and eccentric weight is equal to or slightly greater than 20 cycles/sec.

8. A car shakeout apparatus as claimed in claim 1 wherein the motor operates at a speed of 1200 rev./min. and the natural frequency of the frame, spring means and hammers is equal to approximately 24 cycles/sec.

9. A car shakeout apparatus comprising a frame having a rectangular configuration, a pair of motor mounting supports carried by the opposite end portions of the frame, a motor mounted on each support, at least one eccentric weight mounted on the output shaft of each motor, a pair of hammers resiliently carried by said frame with one of said hammers in vertical alignment with one of said motors, spring means suspending said hammers from said frame, means for raising and lowering said frame to align said hammers with the top edge of the spaced side walls of a loaded car, means for independently driving said motors and eccentrics whereby the eccentrics will self-synchronize, said motors and eccentric weights forming a single mass system having a natural frequency close to the operating speed of said motors when said hammers are in contact with the car; and said frame, springs means and hammers forming a two mass system having a natural frequency above the operating speed of the motors when said hammers break contact with the car whereby the combined alternating single mass system and two mass system produce rapid high energy vertical impacts on the car for loosening the material in the car.

* * * * *